US012433808B2

(12) United States Patent
Case

(10) Patent No.: US 12,433,808 B2
(45) Date of Patent: Oct. 7, 2025

(54) DRESSING CHAIR

(71) Applicant: Janet M Case, Charlotte, ME (US)

(72) Inventor: Janet M Case, Charlotte, ME (US)

( * ) Notice: Subject to any disclaimer, the term of this patent is extended or adjusted under 35 U.S.C. 154(b) by 80 days.

(21) Appl. No.: 18/416,933

(22) Filed: Mar. 7, 2024

(65) Prior Publication Data

US 2025/0281340 A1 Sep. 11, 2025

(51) Int. Cl.
*A61G 7/10* (2006.01)
*A61G 7/053* (2006.01)

(52) U.S. Cl.
CPC ........... *A61G 7/1059* (2013.01); *A61G 7/053* (2013.01); *A61G 7/103* (2013.01); *A61G 7/1074* (2013.01)

(58) Field of Classification Search
CPC .... A61G 7/1025; A61G 7/1026; A61G 7/103; A61G 7/1032; A61G 7/1034; A61G 7/1036; A61G 7/1038; A61G 7/104; A61G 7/1042; A61G 7/1044; A61G 7/1046; A61G 7/1053; A61G 7/1059; A61G 7/1074
See application file for complete search history.

(56) References Cited

U.S. PATENT DOCUMENTS 4,155,588 A * 5/1979 Danziger ............ A61G 5/1094 5/81.1 R
4,168,549 A * 9/1979 Davies ................ A61G 7/1003 4/578.1
5,903,935 A * 5/1999 Huelke .................. A47K 3/122 4/578.1
7,487,559 B1 * 2/2009 Denosky .............. A61G 7/1025 5/81.1 HS
10,434,023 B1 * 10/2019 Fonarow .............. A61G 7/1026
2006/0103182 A1 * 5/2006 Augustine ............ A61G 5/1054 297/154
2011/0035876 A1 * 2/2011 Chang .................. A61G 5/1054 5/81.1 R
2011/0304186 A1 * 12/2011 Andrews .............. A61G 7/1026 5/81.1 R
2015/0013060 A1 * 1/2015 Walters ................ A61G 7/1003 4/579
2016/0296390 A1 * 10/2016 Rebbie ................. A61G 7/1001
2017/0020759 A1 * 1/2017 Gonçalo De Freitas .................... A61G 7/1032
2018/0344556 A1 * 12/2018 Garman ............... A61G 5/1018
2019/0254900 A1 * 8/2019 Pelletier ................. A61G 7/053
2020/0297565 A1 * 9/2020 McIntosh ............. A61G 7/1025
2020/0405556 A1 * 12/2020 Henderson ............... A63G 4/00
2021/0052443 A1 * 2/2021 Tu ........................ A61G 7/1025

* cited by examiner

*Primary Examiner* — George Sun

(57) ABSTRACT

The Dressing Chair represents a significant leap forward in client care, revolutionizing the way individuals living at home or in healthcare settings experience independence and mobility. By combining essential components in a thoughtfully designed structure, this invention reduces falls, increases safety, eliminates the need for constant caregiver assistance, providing the user with a renewed sense of freedom, independence, and control over their lives. This abstract encapsulates the essence of The Dressing Chair, a novel solution that revolutionizes client care, providing support and dignity to individuals with limited mobility.

3 Claims, 8 Drawing Sheets

DRESSING CHAIR

Figure 1:
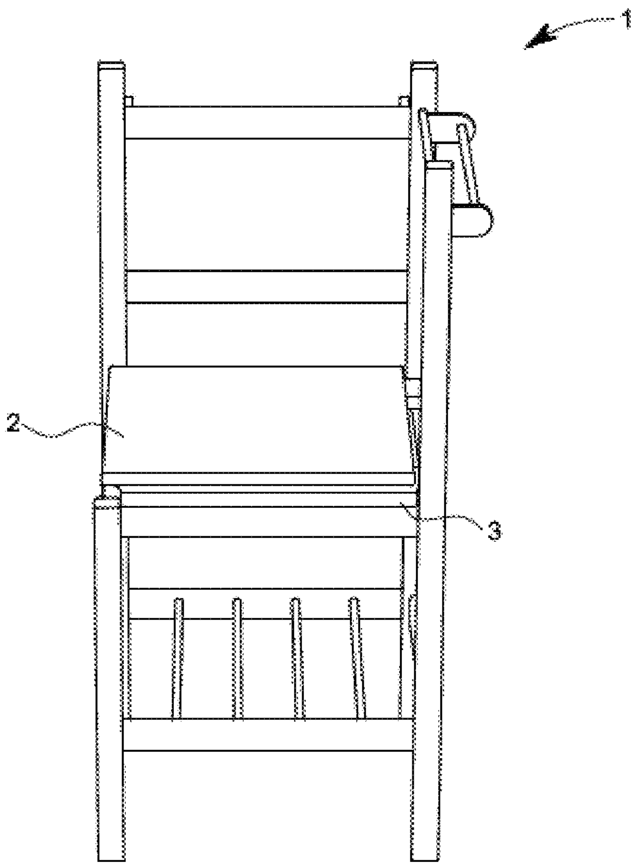

A mobility device for persons experiencing a loss of independent functional mobility. The device assists these people for completing safe, independent transfers to and from bed and provides stability for dressing.

This device is a bed-mobility, dressing, storage and transfer assist chair that improves the users safety and independence called "The Dressing Chair"

CROSS-REFERENCE TO RELATED APPLICATIONS

Not Applicable

STATEMENT REGARDING FEDERALLY SPONSORED RESEARCH OR DEVELOPMENT

Not Applicable

Reference to a sequence listing, a large table, or a computer program listing appendix on read-only optical disc.

Not Applicable

BACKGROUND

The Dressing Chair gives the user more comfort & safety while performing the transfer.

The Dressing Chair is uniquely designed with the fold out platform and back and side supports, The Dressing Chair allows the user to complete basic transfers safely, with more independence and more confidence.

The Dressing Chair is design to help the user to get out of their bed to standing at the bedside and then getting back onto the bed.

The Dressing Chair is easy to use and requires minimal training.

The Dressing Chair can prevent people from sliding off their bed, onto the floor, while they are sitting on the edge of the bed to dress.

The present invention pertains to a groundbreaking mobility assistance device known as The Dressing Chair. This invention is specifically designed to provide essential support and enhance the mobility and independence of the user, for those in healthcare settings or at home.

Reference Number & Codes

Unique Entity ID: TYDUF3G7SVL8

USPTO Patent customer Number QSN EBC 197583

NAICS Code Description 446190 621340

IRS Taxpayer Identification Number 204484112

The Dressing Chair comprises a composite material, wooden or metal structure resembling a chair with a platform that folds out onto the bed, The Dressing Chair is conveniently positioned at the client's bedside. Patients can utilize this unique device for facilitating independent and safe activities such as: Transitioning from a lying position to sitting at the edge of the bed. Transferring independently and safely from sitting at the edge of the bed to sitting on the solid and more secure Dressing Chair.

With The Dressing Chair's back support and side supports, the client can dress and undress with improved safety and more confidence, dignity & independence. The patient can access clean clothing and footwear stored on The Dressing Chair safely and securely. Their risk of falling out of bed while dressing is greatly reduced.

With the dressing chair's back and side supports the client can safely complete perineal care and don clean undergarments and clothes that are set up on The Dressing Chair.

Moving to a standing position. Once the person using The Dressing Chair is sitting safely on The Dressing Chair-then she/he can do stand-pivot transfer down to a wheelchair or to a walker. The Dressing Chair eliminates the more difficult and dangerous "squat pivot" transfer from bed, up into a wheelchair.

The invention significantly reduces the need for client care assistants, thereby promoting a sense of regained independence and mobility.

DESCRIPTION OF THE PRIOR ART

Historically, people with limited or diminished functional mobility, living at home or in healthcare settings have relied heavily on caregivers for various daily activities, including getting in and out of bed, dressing, and putting on their shoes. These activities often require significant assistance, and clients with limited mobility are at risk of losing their independence. Existing assistive devices can be cumbersome, limiting patients' mobility and potentially affecting their quality of life. Families have suffered catastrophic emotional and financial distress when a family member or spouse requires the services of: Long Term Care, Acute Rehabilitation, Hospital custodial bed, Assisted Living and other placements. Right now, the most hopeful approach is the philosophy of "Aging in Place."

BRIEF SUMMARY OF THE INVENTION

The Dressing Chair, inspired by the urgent need to make possible a persons' desire to—Age in Place and or recover maximal, independent, functional mobility. The Dressing Chair is a novel mobility assistance device designed to revolutionize client care. It is specifically engineered to provide invaluable support to clients, particularly the elderly and those with limited mobility. This invention is made from composite material, wooden or metal; is a transfer device that stays by the user's bedside. The Dressing Chair requires no electric or battery power, making it easily integrated into healthcare settings, The Dressing Chair stays at the client's bedside and does not have to be moved.

The essential components of The Dressing Chair include a transfer platform that unfolds onto the client's bed, allowing for a safe and easy transition from the bed to the chair. The device also features sturdy hand grips, a backrest and a side support that enable clients to transfer from bed to sitting on the Dressing Chair enhancing their safety, mobility, and independence.

The method of using The Dressing Chair is straightforward. Client begins by using the hand grips to sit up from their reclined position. Once sitting the users can unfold the transfer platform onto their bed, the transfer platform fold out right nest to the user, they can then slide onto the extended transfer platform of the chair, subsequently moving onto the chair itself.

Notice that once the client-user has shifted onto the fold out platform then the user's weight holds the Dressing Chair fixed, right next to the bed, giving the user a feeling of improved stability and safety.

The Dressing Chair provides support & stability for activities such as donning & doffing clothing and footwear, and its sturdy design allows clients to raise themselves to a standing position, eliminating the need for external assistance. It also allows clients to attend to their personal hygiene more safely.

The Dressing Chair is a unique, low-tech, safe affordable device that dramatically improves a persons ability to Age in Place with maximum independence. Also 'The Dressing Chair' protects the caregiver from heavy lifting of the client/family member.

FIGURES BRIEF DESCRIPTION OF DRAWINGS

FIG. 1 of 8 Is a front view of the dressing chair with platform in closed position.

Figure 2:
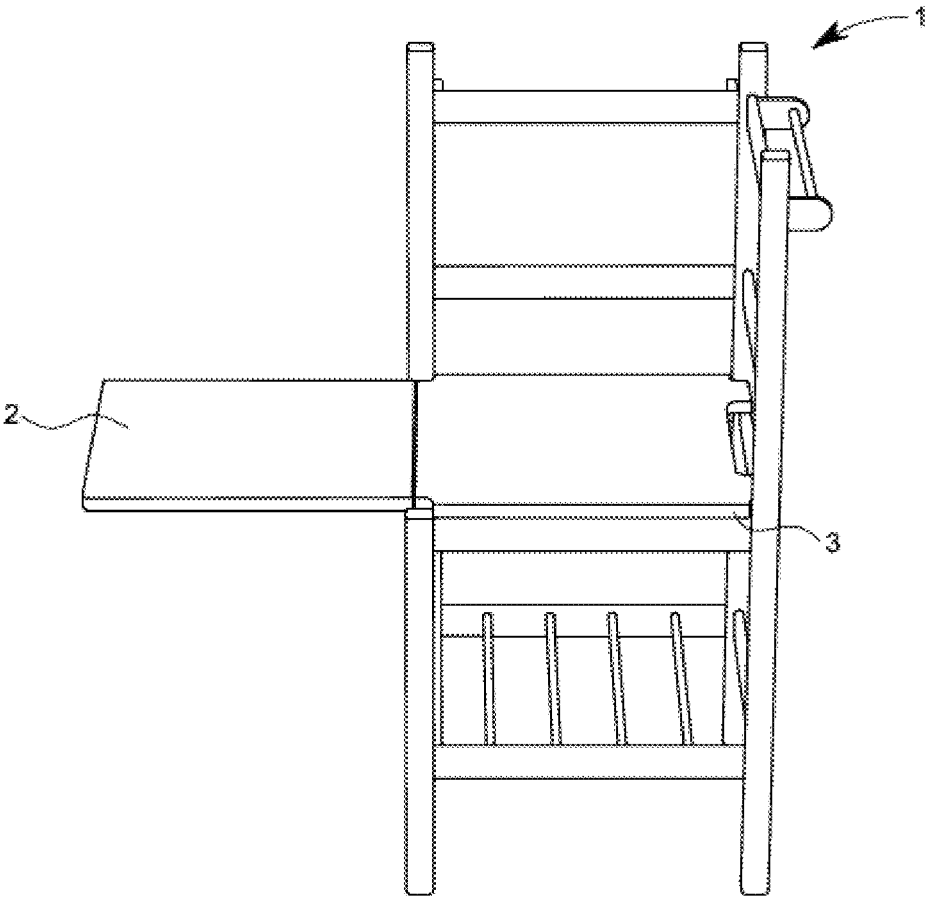

FIG. 2 of 8 Is a front view of the dressing chair with platform in folded out position.

Figure 3:
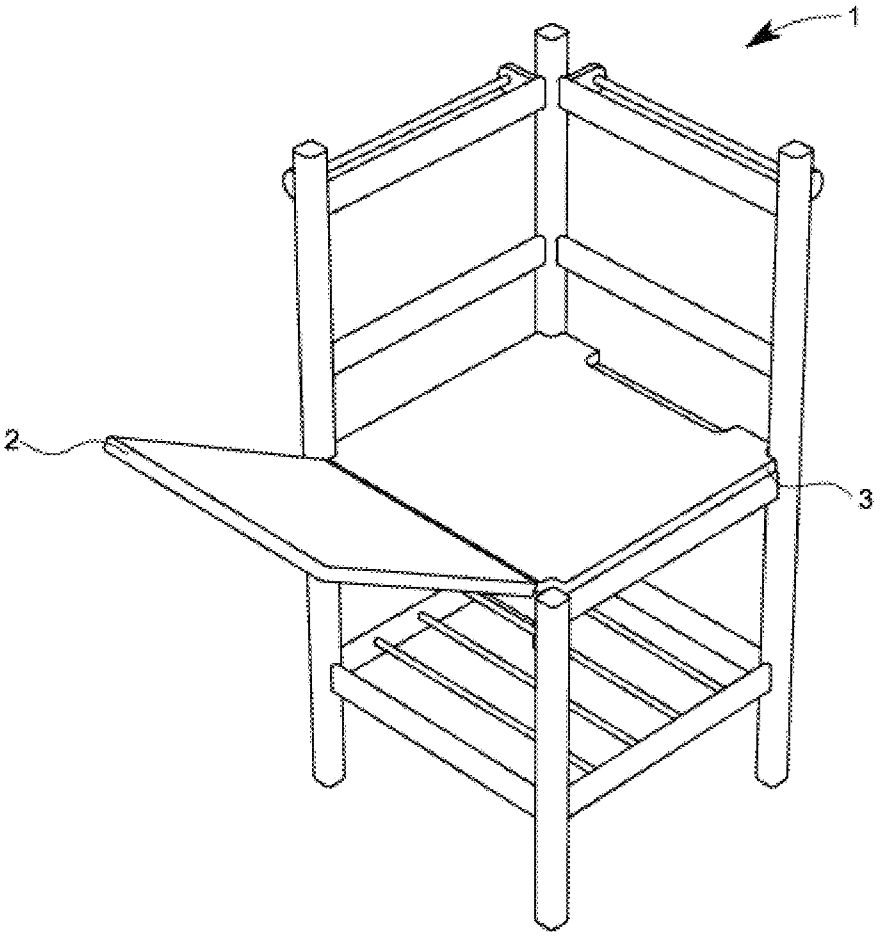

FIG. 3 of 8 Is an oblique view of the dressing chair with platform in the process of being folded out into the transfer platform position, supported on the bed. The fold out platform uses hinges for stability.

Figure 4:
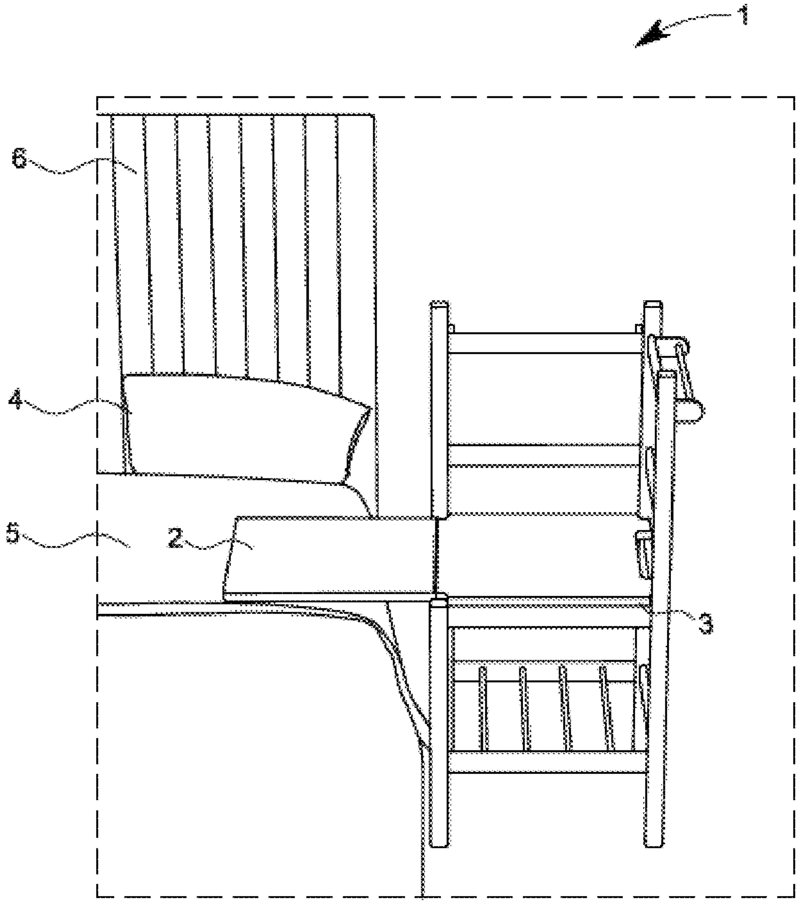

FIG. 4 of 8 Is a front view of the dressing chair with fold out platform in the folded out position. The fold out platform is supported on the bed.

Figure 5:
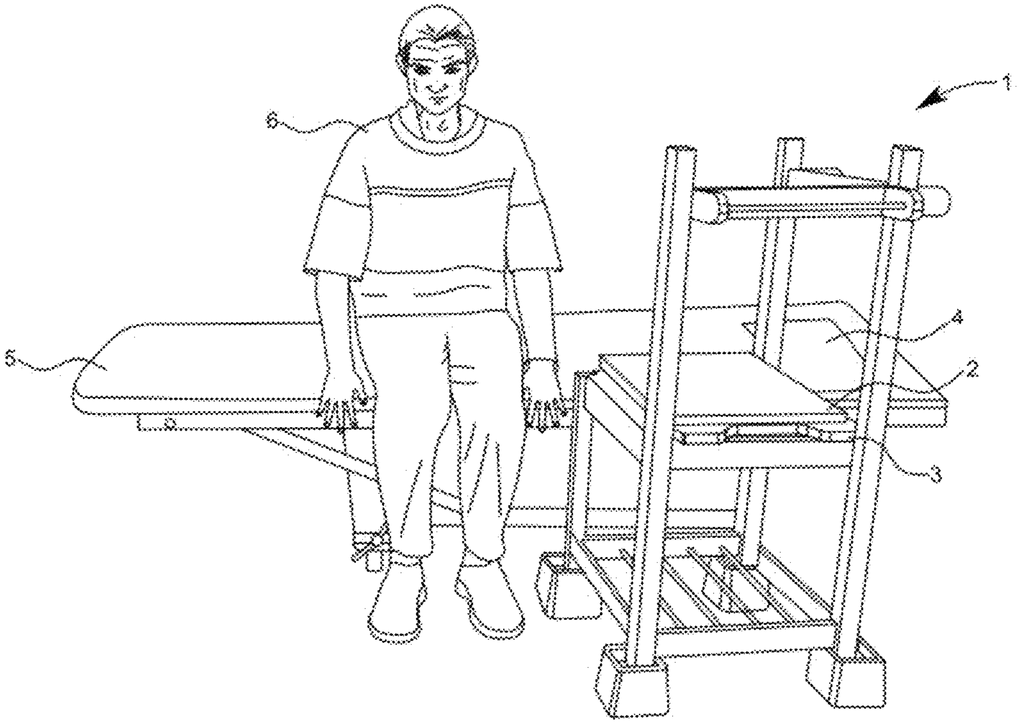

FIG. 5 of 8 Is a front view of the client sitting on the edge of the bed with the dressing chair at the bed side.

Figure 6:
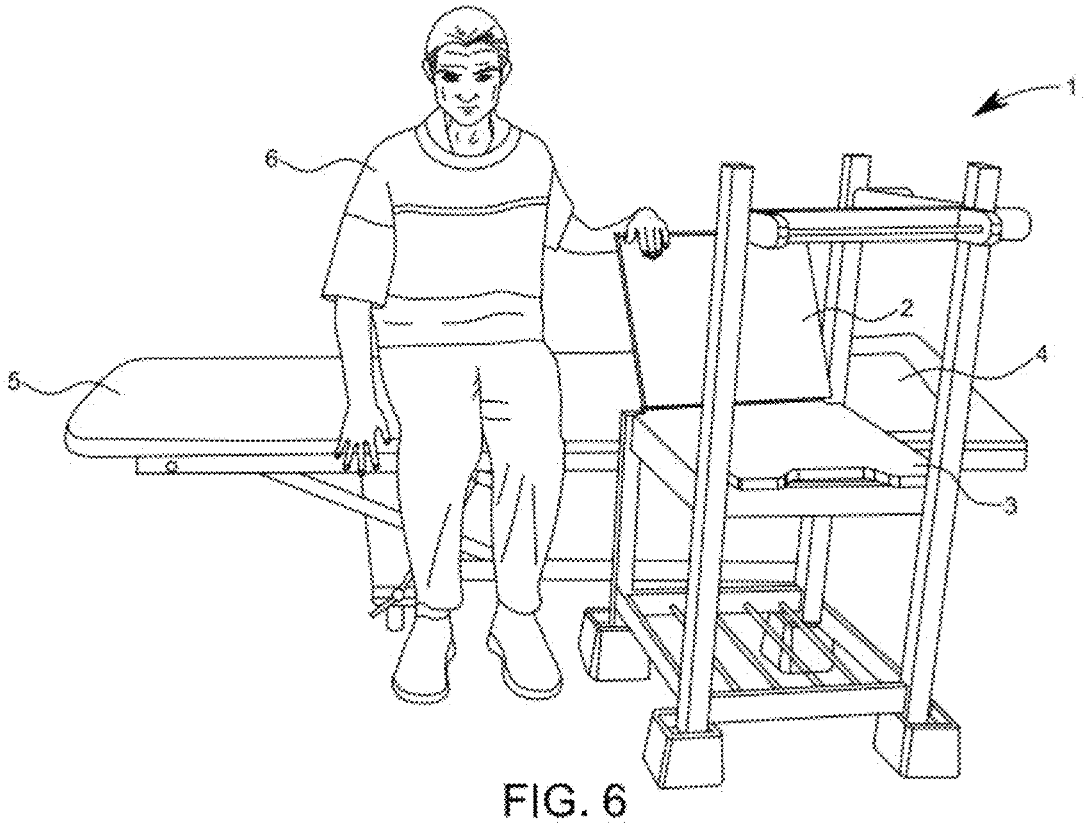

FIG. 6 of 8 Is a front view of the client sitting on the edge of the bed with the dressing chair at the bed side. The client is folding out the platform.

Figure 7:
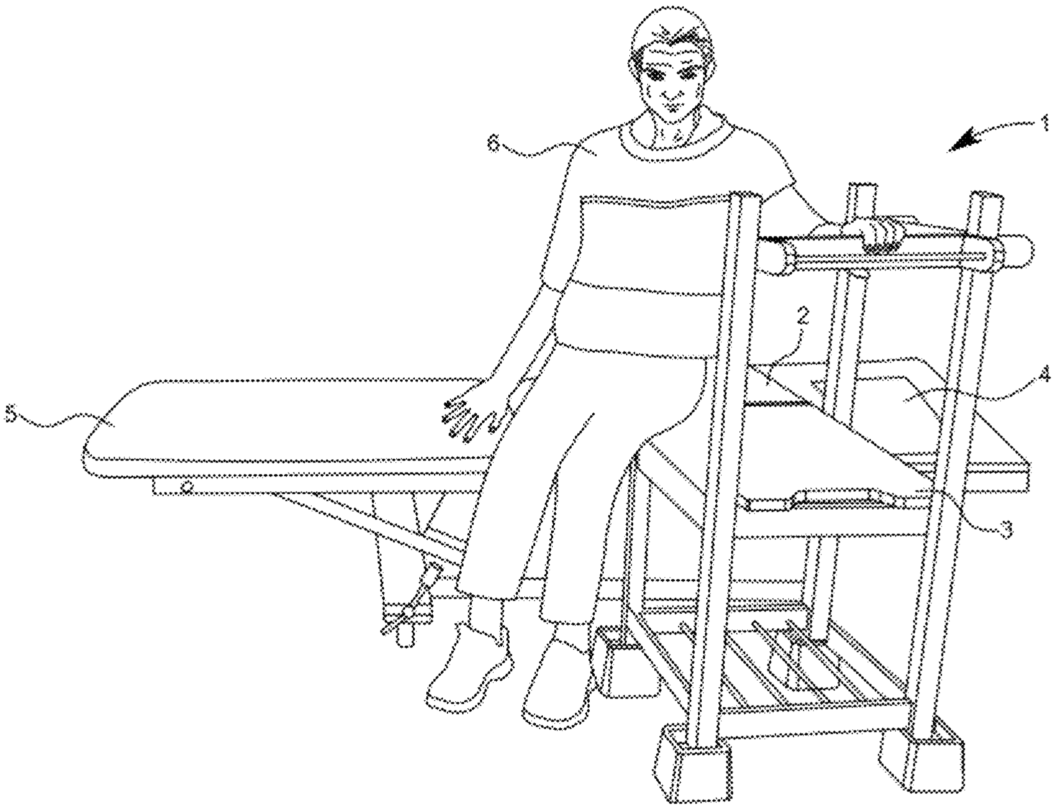
Figure 8:
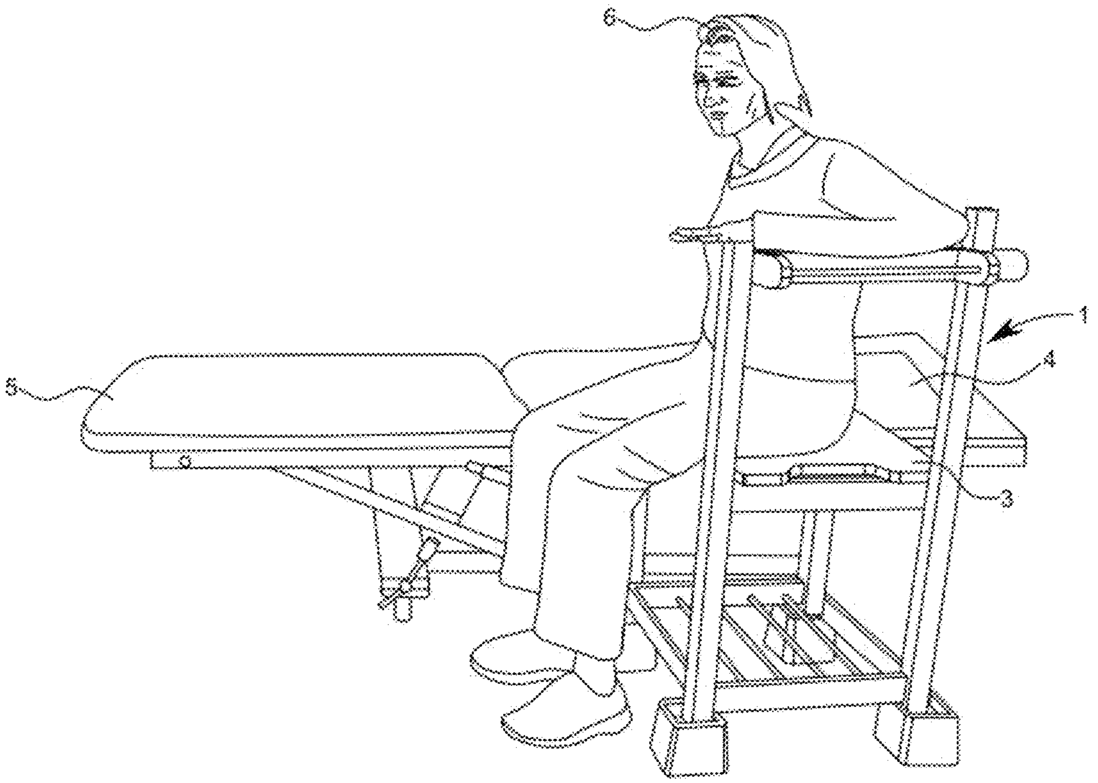

FIG. 7 of 8 Is a front view of the client, the client is using the dressing chairs rails and fold out platform to slide onto the fold-out platform FIG. 8 of 8 Is a side view of the client, she is sitting on the unhinged, fixed seat of the dressing chair. The client is ready to use the arm rest and platform to transfer from sitting to standing easily and safely. Or to a wheelchair, cane or walker

DETAILED DESCRIPTION OF DRAWINGS

FIG. 1 of 8 Is a front view of the dressing chair with platform in closed position.

FIG. 1 of 8 comprises detail number 1 the side support and railings.

FIG. 1 of 8 comprises detail number 2 the hinged fold out platform.

FIG. 1 of 8 comprises detail number 3 the fixed/non folding seat.

FIG. 2 of 8 comprises the front view of the dressing chair showing the platform folded out and the fixed/non folding seat FIG. 2 of 8 comprises detail number 1 the side support and railings.

FIG. 2 of 8 comprises detail number 2 the hinged fold out platform.

FIG. 2 of 8 comprises detail number 3 the dressing chair seat that is not hinged and does not fold out.

FIG. 3 of 8 Is an oblique view of the dressing chair with platform in the process of being folded out into the folded out position. The fold out platform uses the hinges for stability.

FIG. 3 of 8 comprises detail number 1 the side support and railings.

FIG. 3 of 8 comprises detail number 2 the hinged fold out platform supported on hinges.

FIG. 3 of 8 comprises detail number 3 the dressing chair seat that is not hinged and does not fold out.

FIG. 4 of 8 Is a front view of the dressing chair with fold out platform in the folded out position. The fold out platform is supported on the bed.

FIG. 4 of 8 comprises detail number 1 the side support and railings.

FIG. 4 of 8 comprises detail number 2 the hinged fold out platform supported on the bed.

FIG. 4 of 8 comprises detail number 3 the dressing chair seat that is not hinged and does not fold out.

FIG. 4 of 8 comprises detail number 4, the dressing chair transfer platform is folded onto the bed just below the lower margin of the pillow. The figure detail points to the bed pillow.

FIG. 4 of 8 comprises detail number 5 the position of the dressing chair platform folded onto the bed with respect to bed linen.

FIG. 4 of 8 comprises detail number 6 the position of the dressing chair platform folded onto the bed with respect to the headboard of the bed.

FIG. 5 of 8 Is a front view of the client sitting on the edge of the bed with the dressing chair at the bed side, ready for use.

FIG. 5 of 8 comprises detail number 1 the side support and railings.

FIG. 5 of 8 comprises detail number 2 the fold out platform is in the closed position.

FIG. 5 of 8 comprises detail number 3 the dressing chair seat that is not hinged and does not fold out.

FIG. 5 of 8 comprises detail number 4 indicates the pillow at the head of the bed.

FIG. 5 of 8 comprises detail number 5 indicates the foot of the bed.

FIG. 5 of 8 comprises detail number 6 the client is sitting on the bed ready to use the dressing chair.

FIG. 6 of 8 Is a front view of the client sitting on the edge of the bed with the dressing chair at the bed side.

FIG. 6 of 8 comprises detail number 1 the side support and railings.

FIG. 6 of 8 comprises detail number 2 the client has grasped the fold out platform and is the process of folding-out the transfer platform to support it on the bed.

FIG. 6 of 8 comprises detail number 3 the dressing chair seat that is not hinged and does not fold out.

FIG. 6 of 8 comprises detail number 4 indicates the pillow at head of the bed, the head of the bed is not visible in this view.

FIG. 6 of 8 comprises detail number 5 indicates the foot of the bed.

FIG. 6 of 8 comprises detail number 6 the client is sitting on the bed ready to use the dressing chair.

FIG. 7 of 8 Is a front view of the client, the client is using the dressing chair's rails and fold out platform to slide onto the fold-out platform FIG. 7 of 8 comprises detail number 1 the side support and railings.

FIG. 7 of 8 comprises detail number 2 the folding-out platform is fully open and supported on the bed FIG. 7 of 8 comprises detail number 3 the dressing chair seat that is not hinged and does not fold out.

FIG. 7 of 8 comprises detail number 4 indicates the head of the bed and pillow, the head of the bed is not visible in this view.

FIG. 7 of 8 comprises detail number 5 indicates the foot of the bed.

FIG. 7 of 8 comprises detail number 6 the client is sitting on the fold-out platform and is transferring from the fold-out platform onto the dressing chair seat that is not hinged and does not fold out.

FIG. 8 of 8 Is a side view of the client, she is sitting on the unhinged, fixed seat of the dressing chair, supported by the side rails and back rails. She can also stay sitting on the dressing chair to attend to personal hygiene and dressing safely. The client is ready to use the arm rest and platform to transfer from sitting to standing easily and safely. Then to a wheelchair, cane or walker.

FIG. 8 of 8 comprises detail number 1 the side support, sturdy arm support and railings.

FIG. 8 of 8 comprises detail number 2 the fold-out platform (not visible in this figure).

FIG. 8 of 8 comprises detail number 3 the dressing chair seat that is not hinged and does not fold out.

FIG. 8 of 8 comprises detail number 4 indicates the head of the bed, the head of the bed is not visible in this view.

FIG. 8 of 8 comprises detail number 5 indicating the foot of the bed.

FIG. 8 of 8 comprises detail number 6 indicating the client sitting on the dressing chair seat that is not hinged and does not fold out. She used the fold-out platform and slid across to the unhinged, fixed seat using the side support and back support to prevent falling. Using her arms on the supports provided by the dressing chair the client can easily push up into standing.

DETAILED DESCRIPTION OF THE INVENTION

The Dressing Chair is a solution that addresses the limitations of existing mobility assistance devices. It is made of structural grade composite material, wood, or metal. The Dressing Chair is thoughtfully designed to provide clients with the support they need to regain and retain their independence and mobility.

The pivotal components of The Dressing Chair include the following:

The Dressing Chair is positioned at the client's bedside. It does not need to be moved.

The Dressing Chair has a transfer platform that unfolds onto the client's bed, the user can safely transfer from bed to sitting on The Dressing Chair, then into standing.

The Dressing Chair has a unique transfer platform that unfolds onto the client's bed, the user can safely transfer from standing to sitting on The Dressing Chair, then onto their bed.

The Dressing Chair has unique construction that includes, sturdy hand grips a backrest and side supports for the user to perform transfers from or to their bed, without The Dressing Chair the client might require one or two assistants and other devices that are expensive and less sturdy.

Unique support features of The Dressing Chair comprise sturdy side support, sturdy back support and a fold out transfer platform. Using The Dressing Chair the client can safely don & doff clothing and footwear complete personal hygiene and dressing, safely and with improved independence.

The process of using The Dressing Chair is as follows:

The client/user is sitting on their bed, they can then smoothly transition onto the extended transfer platform of the chair, using the unique handgrips and back support and transfer platform, once sitting on the transfer platform the user then easily transfer to the fixed seat of The Dressing Chair.

The Dressing Chair has many unique features; once the user has transferred to the fold out platform the user's body weight combined with the unique structure of The Dressing Chair makes a very stable transfer device, the user will have extra confidence that their chance of falling is much reduced. A typical "sliding board" is not stable and can fall off the bed or move off the wheel chair as the user tries to perform the transfer.

The Dressing Chair has side and back supports; the user can safely and independently complete activities such as donning clothing and footwear and attending to basic personal hygiene. These same activities, without The Dressing Chair can put the client at risk of falling off their bed, as the mattress provides no support and is slippery.

Patients can also use the chair's dependable support features to raise themselves to a standing position.

Typical dimensions are listed below height, floor to top of chair is 44 inches height, floor to seat of chair is 25 inches width, of each side is 20½ inches depth across the seat, top closed is 16½ inches depth across the seat, top open is 32 inches The Dressing Chair dimensions are not limited to those listed above, These dimensions can be customized to meet individual requirements Advantages of the Dressing Chair The Dressing Chair represents a significant advancement in the field of client care. It offers several distinct advantages, including:

Enhanced Mobility: The Dressing Chair helps client transition from their bed to a seated position then to standing position independently. Once standing, the client can safely sit into their wheelchair or grab their walker, to start their day.

Reduced Dependency: Patients can perform essential activities, such as putting on clean clothes and shoes, without the need for assistance from a personal care aid.

Improved Quality of Life: The Dressing Chair fosters a heightened sense of independence, mobility, and overall well-being among clients who require mobility assistance.

The Dressing Chair is Unique

The Dressing Chair is a groundbreaking mobility assistance device designed to enhance client mobility and independence, particularly for those individuals and their families who are struggling to adapt to a loss of independent functional mobility. The Dressing Chair has a vital commitment to the philosophy of "Aging in Place" and or recovering their maximal independent functional mobility. This innovative invention consists of a composite material, wooden or metal structure resembling a chair, conveniently positioned at the client's bedside. Patients can use this device to transition from a lying position to seated at the edge of their bed. Then, using the transfer platform, transfer safely and independently to the Dressing Chair. The Dressing Chair has side supports and a back rest so that the user can more easily and safely use hygiene products, don footwear and clothing and efficiently move to a standing position or to a wheelchair or walker. The Dressing Chair significantly reduces the reliance on personal care assistants, promoting a sense of regained independence and improved quality of life.

Statistics from [National Alliance for Caregiving and AARP. (2015)]

Problem patients have limited mobility and require assistance for getting in/out of bed and dressing, and the client has an increased risk of falling without direct assist of a caretaker.

For clients who require caregivers the caregivers perform or assist the client with 28% of activities of daily living. Mostly assisting with getting in and out of beds and chairs (43%) of the care givers activities.

Wheelchairs and walkers are not stable, provide little support for independence for getting in/out of bed and dressing routines.

The invention claimed is:

1. A Dressing Chair comprising:

a frame of four legs, wherein the frame of four legs comprises three long legs and one short leg, a chair seat that is supported on the legs, wherein the chair seat comprises a fixed seat that is secured onto the chair frame and a second seat on top of the fixed seat, wherein the second seat is hinged to the fixed seat so that the second seat can fold out onto a bed, wherein the second seat is built with a recess so that a user can easily grip the second seat to move the seat from a first position to a second position, wherein the first position comprises the second seat folded onto the first-fixed seat, wherein the second position comprises the second seat folded out onto a bed and resting securely on the bed, a plurality of back rails and a plurality of side rails, wherein the plurality of rails and the three long legs further comprises a plurality of hand grips so that a user can more easily and safely transfer from sitting on the bed to sitting in said Dressing Chair, said plurality of rails and hand grips support the user and prevent falls while performing transfers to and from said Dressing Chair and while sitting in said Dressing Chair, said plurality of rails and hand grips allow the user to transfer more easily & safely from sitting on said Dressing Chair to standing, similarly transfer from said Dressing Chair safely back into bed.

2. The Dressing Chair of claim 1 wherein by using the hand holds, side rails, back rails and supports the user can more easily and safely perform activities of daily living (ADLs) including personal hygiene, dressing and functional mobility, wherein a user can access important items that are hanging from rails at back and side of a Dressing Chair, wherein a user can access important items that are stored on a shelf under the seat of a dressing chair, this shelf is solid or composed of rods or dowlings of various materials.

3. The Dressing Chair of claim 1, wherein the chair is positioned at a bedside and does not move, wherein the Dressing Chair has no wheels or motors and is constructed from durable material that can be washed and disinfected with no loss of durability or aesthetic.

* * * * *